United States Patent
Howe et al.

(10) Patent No.: US 12,499,006 B2
(45) Date of Patent: Dec. 16, 2025

(54) FUNCTIONAL SAFETY HIGH-SPEED COUNTER MODULE INCLUDING DIAGNOSTICS CIRCUITRY FOR PERFORMING COUNTER PATTERN TEST

(71) Applicant: SIEMENS AKTIENGESELLSCHAFT, Munich (DE)

(72) Inventors: Jeffrey Howe, Johnson City, TN (US); William Keith Bryant, Johnson City, TN (US); Steven Parfitt, Johnson City, TN (US); Steven M. Hausman, Johnson City, TN (US); Thomas Brian Hartley, Johnson City, TN (US)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 18/549,851

(22) PCT Filed: Mar. 11, 2021

(86) PCT No.: PCT/US2021/021805
§ 371 (c)(1),
(2) Date: Sep. 8, 2023

(87) PCT Pub. No.: WO2022/191842
PCT Pub. Date: Sep. 15, 2022

(65) Prior Publication Data
US 2024/0303154 A1    Sep. 12, 2024

(51) Int. Cl.
*G06F 11/00* (2006.01)
*G06F 11/07* (2006.01)
*G06F 21/57* (2013.01)

(52) U.S. Cl.
CPC ...... *G06F 11/0793* (2013.01); *G06F 11/0751* (2013.01); *G06F 21/572* (2013.01)

(58) Field of Classification Search
CPC ............ G06F 11/0793; G06F 11/0751; G06F 11/076; G06F 11/1662
See application file for complete search history.

(56) References Cited

U.S. PATENT DOCUMENTS

2008/0165913 A1* 7/2008 Roquelaure ............ H03K 21/40
                                                                377/29
2021/0258012 A1* 8/2021 Parfitt .................... H03K 21/40

FOREIGN PATENT DOCUMENTS

EP      1944615 A1    7/2008
WO   2020013819 A1    1/2020

* cited by examiner

*Primary Examiner* — Katherine Lin (57) ABSTRACT

A Functional Safety Counter Module is provided and it comprises input circuitry, test circuitry, a first microcontroller including a first hardware counter, a second hardware counter, a first storage device that stores a first firmware algorithm code to execute a counter pattern test in order to detect a short open input signal and/or a failure in counting capability of the first microcontroller and a second microcontroller including a third hardware counter, a fourth hardware counter, a second storage device that stores a second firmware algorithm code. The first and second firmware algorithm codes are configured to resynchronize and restore respectively a first counter or a second counter after the counter pattern test and are configured to detect an offset and adjust during a resynchronization process to account for the offset such that to successfully resynchronize two separate resynchronization algorithm codes are used depending on an input frequency of counter signals input to four hardware counters.

15 Claims, 5 Drawing Sheets

FUNCTIONAL SAFETY HIGH-SPEED
COUNTER MODULE INCLUDING
DIAGNOSTICS CIRCUITRY FOR
PERFORMING COUNTER PATTERN TEST

BACKGROUND

1. Field

Aspects of the present invention generally relate to a Functional Safety High-Speed Counter Module including diagnostics circuitry for performing Counter Pattern Test.

2. Description of the Related Art

A counter can be used to count up or count down in numbers. A counter circuit is usually constructed of a number of flip-flops connected in cascade or in software code. Counters are a very widely used component in digital circuits, and are manufactured as separate integrated circuits and also incorporated as parts of larger integrated circuits.

A "fail-safe" term in engineering means a design feature or a practice that in the event of a specific type of failure, inherently responds in a way that will cause no or minimal harm to other equipment, the environment or to people. A system being "fail-safe" does not mean that failure is impossible or improbable, but rather that the system's design prevents or mitigates unsafe consequences of the system's failure. Fail-safe means that a device will not endanger lives or property when it fails (see international standards IEC 61508, EN 13849 and IEC 62061).

In development of a Fail-safe or Functional Safety Counter Module, it is necessary to provide diagnostic capability to detect a short or open input signal and/or a failure in the counting capability of a microcontroller. Additionally, this testing must be performed in such a way to not disrupt counting and/or miss incoming counts.

Value pattern and bit pattern diagnostic measures are employed to ensure the integrity of the module's failsafe counting architecture. This is especially needed in the situation where the application is not moving, i.e., not actively counting.

When no counting operation is active, the integrity of the counter input circuits is not completely determinate. Therefore, without additional diagnostic measures, it would be possible for H/W faults to accumulate undetected.

Therefore, there is a need for a better Functional Safety Counter Module.

SUMMARY

Briefly described, aspects of the present invention relate to a Functional Safety Counter Module. Test circuitry is provided on the Functional Safety Counter Module to allow firmware to individually force Sin/Cos and N counter input signals of one of four available counters high or low without affecting the input signals to the other three counters. The firmware periodically takes one of the four counters offline, performs a test to validate the input signals and counting capability, and then restores and resynchronizes the counter under test to the three other counters. This provides a seamless test of the counting capability without sacrificing counting ability during the test time. Since it is not possible to determine whether an application is stopped or just moving slowly, a counter pattern test is executed continually in a sequential order one counter (of the four) at a time. This is regardless of whether external movement is present. The counter pattern test provides a way to diagnose failures in input circuitry and/or microcontroller timers without limiting availability. The test method allows a counter to be individually removed from normal operation, tested, and resynchronized in such a way that overall counting does not have to stop and it is seamless to a counting application. To achieve this behavior, test circuits are implemented that allow individual control of the input signals to each counter and a software algorithm has been developed to implement the test and importantly to resynchronize and restore the counter after the test. Due to variations in thresholds/hysteresis of comparators that are used to interface to the counter signals, it is possible for each counter to be one count off from each other. A firmware algorithm is able to detect this offset and adjust during a resynchronization process to account for it.

In accordance with one illustrative embodiment of the present invention, a Functional Safety Counter Module comprises input circuitry configured to receive counter input signals from an encoder and output first and second counting signals, a first microcontroller including a first hardware counter, a second hardware counter, a first storage device that stores a first firmware algorithm code to execute a counter pattern test in order to detect a short or open input signal and/or a failure in counting capability of the first microcontroller, a second microcontroller including a third hardware counter, a fourth hardware counter, a second storage device that stores a second firmware algorithm code to execute the counter pattern test in order to detect a short or open input signal and/or a failure in counting capability of the second microcontroller, and test circuitry configured to receive a first test signal from the first microcontroller and to receive a second test signal from the second microcontroller. The test circuitry is configured to drive the first and second counting signals being input to the first hardware counter, the second hardware counter, the third hardware counter and the fourth hardware counter. The first firmware algorithm code enables a first counter out of the first hardware counter or the second hardware counter to be individually removed from normal operation, tested, and resynchronized in such a way that overall counting does not have to stop and it is seamless to a counting application. The second firmware algorithm code enables a second counter out of the third hardware counter or the fourth hardware counter to be individually removed from normal operation, tested, and resynchronized in such a way that overall counting does not have to stop and it is seamless to the counting application. The first firmware algorithm code and the second firmware algorithm code are configured to resynchronize and restore respectively the first counter or the second counter after the counter pattern test and are configured to detect an offset and adjust during a resynchronization process to account for the offset such that to successfully resynchronize separate resynchronization algorithm codes are used depending on an input frequency of counter signals input to the first hardware counter or the second hardware counter or the third hardware counter or the fourth hardware counter.

In accordance with one illustrative embodiment of the present invention, a method of testing a Functional Safety Counter Module is provided. The method comprises a step of providing input circuitry configured to receive counter input signals from an encoder and output first and second counting signals. The method further comprises a step of providing a first microcontroller including a first hardware counter, a second hardware counter, a first storage device that stores a first firmware algorithm code to execute a counter pattern test in order to detect a short or open input signal and/or a failure in counting capability of the first microcontroller. The method further comprises a step of providing a second microcontroller including a third hardware counter, a fourth hardware counter, a second storage device that stores a second firmware algorithm code to execute the counter pattern test in order to detect a short or open input signal and/or a failure in counting capability of the second microcontroller. The method further comprises a step of providing test circuitry configured to receive a first test signal from the first microcontroller and to receive a second test signal from the second microcontroller. The test circuitry is configured to drive the first and second counting signals being input to the first hardware counter, the second hardware counter, the third hardware counter and the fourth hardware counter. The first firmware algorithm code enables a first counter out of the first hardware counter or the second hardware counter to be individually removed from normal operation, tested, and resynchronized in such a way that overall counting does not have to stop and it is seamless to a counting application. The second firmware algorithm code enables a second counter out of the third hardware counter or the fourth hardware counter to be individually removed from normal operation, tested, and resynchronized in such a way that overall counting does not have to stop and it is seamless to the counting application. The first firmware algorithm code and the second firmware algorithm code are configured to resynchronize and restore respectively the first counter or the second counter after the counter pattern test and are configured to detect an offset and adjust during a resynchronization process to account for the offset such that to successfully resynchronize separate resynchronization algorithm codes are used depending on an input frequency of counter signals input to the first hardware counter or the second hardware counter or the third hardware counter or the fourth hardware counter.

DETAILED DESCRIPTION

To facilitate an understanding of embodiments, principles, and features of the present invention, they are explained hereinafter with reference to implementation in illustrative embodiments. In particular, they are described in the context of a Fail-safe or Functional Safety Counter Module that provides diagnostic capability to detect a short or open input signal and/or a failure in the counting capability of a microcontroller. Additionally, this testing is performed in such a way to not disrupt counting and/or miss incoming counts. Value pattern and bit pattern diagnostic measures are employed to ensure the integrity of the module's failsafe counting architecture. This is especially needed in the situation where the application is not moving, i.e., not actively counting. When no counting operation is active, the integrity of the counter input circuits is not completely determinate. Therefore, with additional diagnostic measures, it would be possible for H/W faults to not accumulate undetected. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the Fail-safe or Functional Safety Counter Module according to the present disclosure are described below with reference to FIGS. 1-5 herein. Like reference numerals used in the drawings identify similar or identical elements throughout the several views. The drawings are not necessarily drawn to scale.

Figure 1:
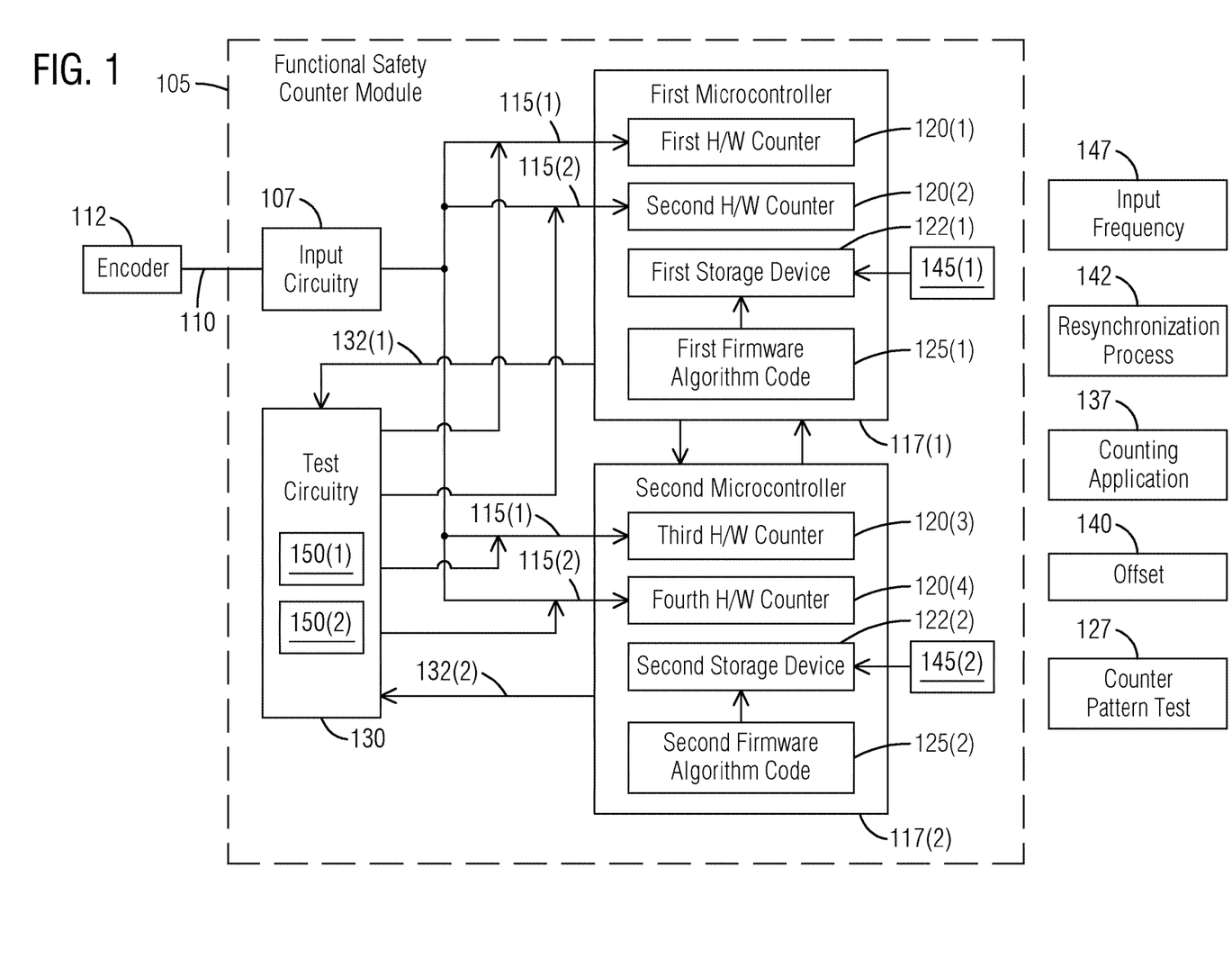
FIG. 1 illustrates a Functional Safety Counter Module including diagnostics circuitry for performing Counter Pattern Test in accordance with an exemplary embodiment of the present invention.

Consistent with one embodiment of the present invention, FIG. 1 represents a Functional Safety Counter Module 105 in accordance with an exemplary embodiment of the present invention. The Functional Safety Counter Module 105 comprises input circuitry 107 configured to receive counter input signals 110 from an encoder 112 and output first and second counting signals 115(1-2). The Functional Safety Counter Module 105 further comprises a first microcontroller 117(1) including a first hardware counter 120(1), a second hardware counter 120(2), a first storage device 122(1) that stores a first firmware algorithm code 125(1) to execute a counter pattern test 127 in order to detect a short or open input signal and/or a failure in counting capability of the first microcontroller 117(1). The Functional Safety Counter Module 105 further comprises a second microcontroller 117(2) including a third hardware counter 120(3), a fourth hardware counter 120(4), a second storage device 122(2) that stores a second firmware algorithm code 125(2) to execute the counter pattern test 127 in order to detect a short or open input signal and/or a failure in counting capability of the second microcontroller 117(2).

The Functional Safety Counter Module 105 further comprises test circuitry 130 configured to receive a first test signal 132(1) from the first microcontroller 117(1) and to receive a second test signal 132(2) from the second microcontroller 117(2). The test circuitry 130 is configured to drive the first and second counting signals 115(1-2) being input to the first hardware counter 120(1), the second hardware counter 120(2), the third hardware counter 120(3) and the fourth hardware counter 120(4).

The first firmware algorithm code 125(1) enables a first counter out of the first hardware counter 120(1) or the second hardware counter 120(2) to be individually removed from normal operation, tested, and resynchronized in such a way that overall counting does not have to stop and it is seamless to a counting application 137. The second firmware algorithm code 125(2) enables a second counter out of the third hardware counter 120(3) or the fourth hardware counter 120(4) to be individually removed from normal operation, tested, and resynchronized in such a way that overall counting does not have to stop and it is seamless to the counting application 137. The first firmware algorithm code 125(1) and the second firmware algorithm code 125(2) are configured to resynchronize and restore respectively the first counter or the second counter after the counter pattern test 127 and are configured to detect an offset 140 and adjust during a resynchronization process 142 to account for the offset 140 such that to successfully resynchronize two separate resynchronization algorithm codes present on both 145(1) and 145(2) are used depending on an input frequency 147 of counter signals input to the first hardware counter 120(1) or the second hardware counter 120(2) or the third hardware counter 120(3) or the fourth hardware counter 120(4).

The Functional Safety Counter Module 105 is configured for performing fail-safe counting of specific electrical pulses. The Functional Safety Counter Module 105 reports events and statuses based on configured parameters and external movement operations in a distributed I/O system. It provides a SIN/COS encoder interface that can safely count up to a maximum speed of 200 kHz.

Functional safety-related systems are primarily concerned with applications whose failure could have impact upon the safety of people and/or the environment. As a result, safety-related systems are used to mitigate hazards or failures that are likely to cause physical harm. Their intent is to achieve safety to an acceptable level of tolerable risk. Fail-safe systems serve to control processes and ensure safe states upon detected failures. Failures are detected using very high levels of diagnostic coverage. Upon detection of failures, actions are taken to attempt to bring the respective application to a safe state. Fail-safe systems provide improved fault detection and fault localization through detailed diagnostic identification and reporting. This is the primary difference between fail-safe systems and standard systems. Use of fail-safe systems should be considered for applications in which hazards are inherently present and may result in physical harm.

In the Functional Safety Counter Module 105, testing is performed in such a way to not disrupt counting and/or miss incoming counts. The test circuitry 130 allows the first firmware algorithm code 125(1) and the second firmware algorithm code 125(2) to individually force the counter input signals 110 as Sin/Cos and N counter input signals of one of four available counters 120(1-4) being the first hardware counter 120(1), the second hardware counter 120(2), the third hardware counter 120(3), the fourth hardware counter 120(4) high or low without affecting the input signals to the other three counters. The first firmware algorithm code 125(1) and the second firmware algorithm code 125(2) periodically take one of the four available counters offline, perform a test to validate the counter input signals 110 and counting capability, and then restore and resynchronize a counter under test to three other counters of the four available counters. The test circuitry 130 includes first and second test circuits 150(1-2) that are implemented to allow respective individual control of the counter input signals 110 to each hardware counter of the first hardware counter 120(1), the second hardware counter 120(2), the third hardware counter 120(3) and the fourth hardware counter 120(4).

The counter pattern test 127 provides a way to diagnose failures in the input circuitry 107 and/or the first hardware counter 120(1), the second hardware counter 120(2), the third hardware counter 120(3) and the fourth hardware counter 120(4) without limiting availability. The counter pattern test 127 initializes a start value and then initiates counting operations (pulses) in both directions such that in one set of cases start values are initialized in such a way that shall force rollovers from both positive and negative directions and in the other cases start values are randomly generated numbers. After completion of the counter pattern test 127 a counter under test is resynchronized to an active counter by assigning a count of the counter under test to a count of the active counter that is running and being a counter that has not been tested.

The two separate resynchronization algorithm codes 145 (1-2) include a low-speed algorithm code 145(1) being used for sinusoidal input frequencies below 125 kHz which calculates and applies the offset 140 to the count of the counter under test to compensate for a scenario where a current position is at an edge in between encoder states. The two separate resynchronization algorithm codes 145(1-2) include a high-speed algorithm code 145(2) being used for sinusoidal input frequencies at or above 125 kHz which sets the count of the counter under test to the count of the active counter and verifies the counter under test and the active counter match.

Figure 2:
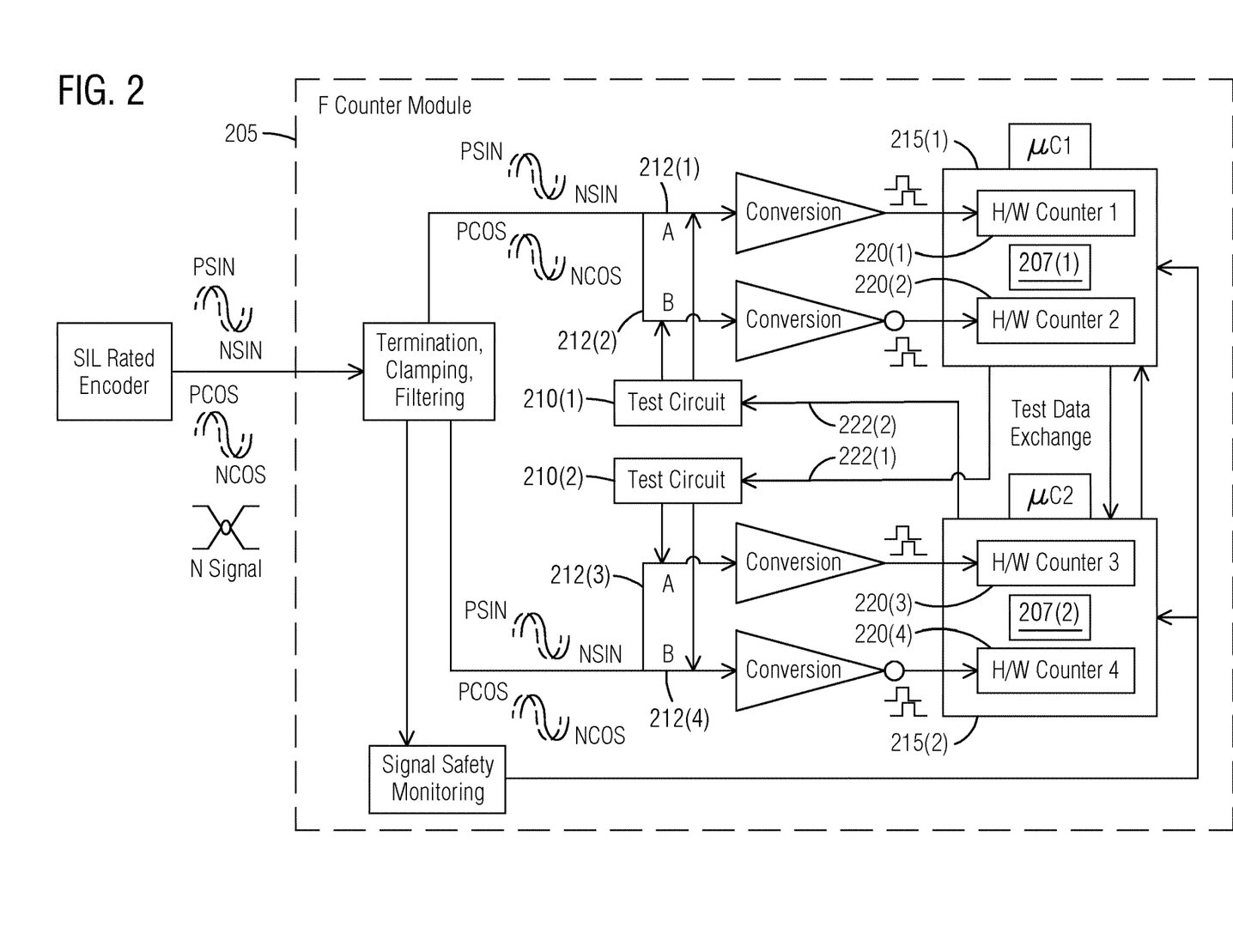
FIG. 2 illustrates another Functional Safety Counter Module with hardware and firmware used to implement Counter Pattern Test in accordance with an exemplary embodiment of the present invention.

Referring to FIG. 2, it illustrates another Functional Safety Counter Module 205 with hardware and firmware used to implement Counter Pattern Test in accordance with an exemplary embodiment of the present invention. The Counter Pattern Test is executed in module firmware 207 (1-2) and utilizes hardware test circuits 210(1-2) to control counting signals 212(1-4). The Functional Safety Counter Module 205 includes four H/W counters 220(1-4). The tests initialize a start value and then initiate counting operations (pulses) in both directions. In one set of cases, the start values are initialized in such a way that shall force rollovers from both positive and negative directions. In the other cases, the start values are randomly generated numbers. Only a single counter is affected at a given time.

In all cases, 20 pulses above or below the start value are generated. The generated counting value is exchanged between two microcontrollers 215(1-2). A deviation is recognized if the evaluation of the comparisons is not equivalent between either of the two microcontrollers 215(1-2). The counter pattern test is expected to result in equivalent counter values between microcontrollers 215(1-2) since there is no external sensor influence.

Pulse generation is performed during a cyclic interrupt. For evaluation, each pulse count is confirmed in an interrupt cycle. Measured values are exchanged between the microcontrollers 215(1-2) and checked against the expected result. Upon successful completion of the test, the counter value is restored to the value of the active counter (main counter that was not part of the recent test).

The pattern tests also provide diagnostic measures for the counting GPIO (general-purpose input/output) pins and the N signal (rotational zero pulse) and verifies that these pins are not stuck high or low and can be read accurately by the microcontrollers 215(1-2).

The overall test structure is defined below. The pattern test is executed in order as indicated by the numbered steps.

1.) Count Up from Start Value and Rollover
   a. A Counter 220(1) is initialized to a set value below the rollover threshold. It is then incremented by using test signals 222(1-2) to drive the A/B signals 212(1-2) of 212(1-4) in the correct pattern to count up one count at a time. At each step, the count is verified by both microcontrollers 215(1-2) before proceeding.
2.) Count Up from Random Number
   a. A Counter 220(1) is initialized to a randomly selected value. It is then incremented by using the test signals 222(1-2) to drive the A/B signals 212(1-2) in the correct pattern to count up one count at a time. At each step, the count is verified by both microcontrollers 215(1-2) before proceeding.

3.) Count Down from Start Value and Rollover
   a. A Counter 220(1) is initialized to a set value above the rollover threshold. It is then decremented by using the test signals 222(1-2) to drive the A/B signals 212(1-2) in the correct pattern to count down one count at a time. At each step, the count is verified by both microcontrollers 215(1-2) before proceeding.

4.) Count Down from Random Number
   a. A Counter 220(1) is initialized to a randomly selected value. It is then decremented by using the test signals 222(1-2) to drive the A/B signals 212(1-2) in the correct pattern to count down one count at a time. At each step, the count is verified by both microcontrollers 215(1-2) before proceeding.

5.) Resynchronize
   a. The counter under test is resynchronized to the count value of the running counter and is now ready to resume normal operation.

After completion of the counter pattern test, a counter under test must be resynchronized to an active counter. To resynchronize, it is necessary to assign the count of the counter that was under test to the value of the running counter (i.e. counter that has not been tested). However, this presents a problem as it is possible that the count of the active counter changes in between reading it and assigning its count value to the counter under test. If this occurs it would result in the counter under test being one count off from the active counter. To prevent this from occurring, the state of the input signals is read during a resynchronization operation. At low counter input speeds this is an effective method of preventing an unintended offset between the two counter values since there is sufficient time to read the input signals before an incoming counter pulse occurs. In rare cases where an edge does occur in between reads, the action can simply be performed again and at this point there should be enough time before the next pulse. However, at high speeds this becomes problematic. Since it is not possible to read all of the input signals simultaneously (they must be read sequentially), it is possible for one of the signals to change in between reads. In the high speed case however, it can be reasonably assumed that an additional counting edge will occur quickly (At low speeds this could take a long time or never occur if stopped).

With reference to FIG. 1, to successfully resynchronize in both scenarios, two separate resynchronization algorithm codes 145(1-2) are used depending on the input frequency of the counter signals. The low-speed algorithm code 145(1), used for sinusoidal input frequencies below 125 kHz, calculates and applies an offset to the count of the counter under test to compensate for the scenario where the current position is at an edge in between encoder states. It then verifies that both counters are either at the same position, or offset by the amount previously used. The high-speed algorithm code 145(2), used for sinusoidal input frequencies at or above 125 kHz, simply sets the count of the counter under test to the count of the active counter and verifies the two counters match. A retry mechanism is provided to compensate for the inability to read both counters simultaneously and the possibility of receiving a count in between steps.

Figure 3:
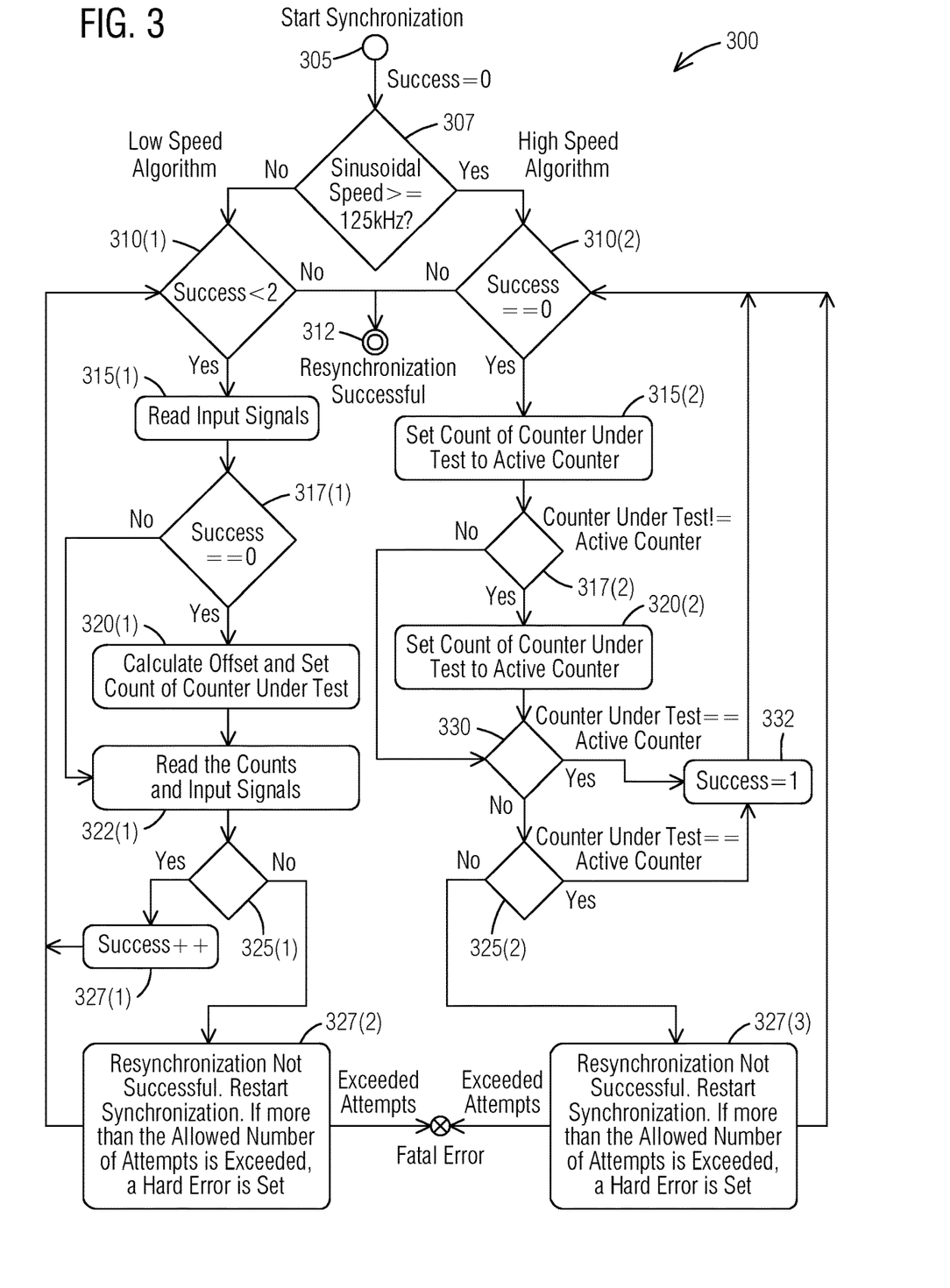
FIG. 3 illustrates a state machine describing operation of resynchronization algorithms in accordance with an exemplary embodiment of the present invention.

Turning now to FIG. 3, it illustrates a state machine 300 describing operation of resynchronization algorithm codes 145(1-2) in accordance with an exemplary embodiment of the present invention. At completion of the counter pattern test it is necessary to resynchronize the count of the counter under test to the count of the running counter. This must be done successfully regardless of whether the external encoder is stationary or rotating at maximum speed. At the end of the resynchronization, the counter that was tested should be synchronized to the other three counters. A resynchronization flow chart shows the algorithm used for this and executed on both microcontrollers. Two different procedures are utilized depending on the speed of the counter input signals and represented on the flow chart as the "Low-speed Algorithm" and "High-speed Algorithm". The resynchronization attempt terminates with either a successful resynchronization or a fatal error if it was not successful.

At a start point 305, a resynchronization process starts. At a decision diamond 307 a check is made to determine whether the sinusoidal speed >=125 kHz? If outcome of the decision is "no," a low-speed algorithm is executed. At a decision diamond 310(1) a check is made to determine whether success <2. If outcome of the decision is "no," resynchronization is successful and the process ends at end 312. If outcome of the decision is "yes," at a block 315 (1) input signals are read. At a decision diamond 317(1) a check is made to determine whether success=0. If outcome of the decision is "yes," at a block 320 (1) the low-speed algorithm calculates an offset and sets a count of the counter under test. At a block 322 (1) the low-speed algorithm reads the counts and input signals. If outcome of the decision diamond 317(1) is "no," the algorithm loops to the block 322(1). At a decision diamond 325(1) a check is made to determine whether counts and input signals match OR counts differ by applied offset and input signals and have not changed since the initial read. If outcome of the decision is "yes," at a block 327(1) the success++ step is performed and the algorithm loops back to the decision diamond 310(1). If outcome of the decision is "no," at a block 327(2) the resynchronization is indicated to be not successful. Restart synchronization is indicated. If more than the allowed number of attempts is exceeded, a hard error is set. The algorithm loops back to the decision diamond 310(1).

At the decision diamond 307 a check is made to determine whether the sinusoidal speed >=125 kHz? If outcome of the decision is "yes," a high-speed algorithm is executed. At a decision diamond 310(2) a check is made to determine whether success==0. If outcome of the decision is "no," resynchronization is successful and the process ends at the end 312. If outcome of the decision is "yes," at a block 315 (2) a count of the counter under test is set to that of the active counter. At a decision diamond 317(2) a check is made to determine whether Counter Under Test !=Active Counter. If outcome of the decision is "yes," at a block 320 (2) the high-speed algorithm sets count of the counter under test to the active counter. At a decision diamond 330 a check is made to determine whether Counter Under Test=Active Counter. If outcome of the decision is "yes," at a block 332 the success=1 step is performed and the algorithm loops back to the decision diamond 310(2). At a decision diamond 325(2) a check is made to determine whether Counter Under Test=Active Counter. If outcome of the decision is "yes," the algorithm goes to the block 332. If outcome of the decision is "no," at a block 327(3) the resynchronization is indicated to be not successful. Restart synchronization is indicated. If more than the allowed number of attempts is exceeded, a hard error is set. The algorithm loops back to the decision diamond 310(2).

Figure 4:
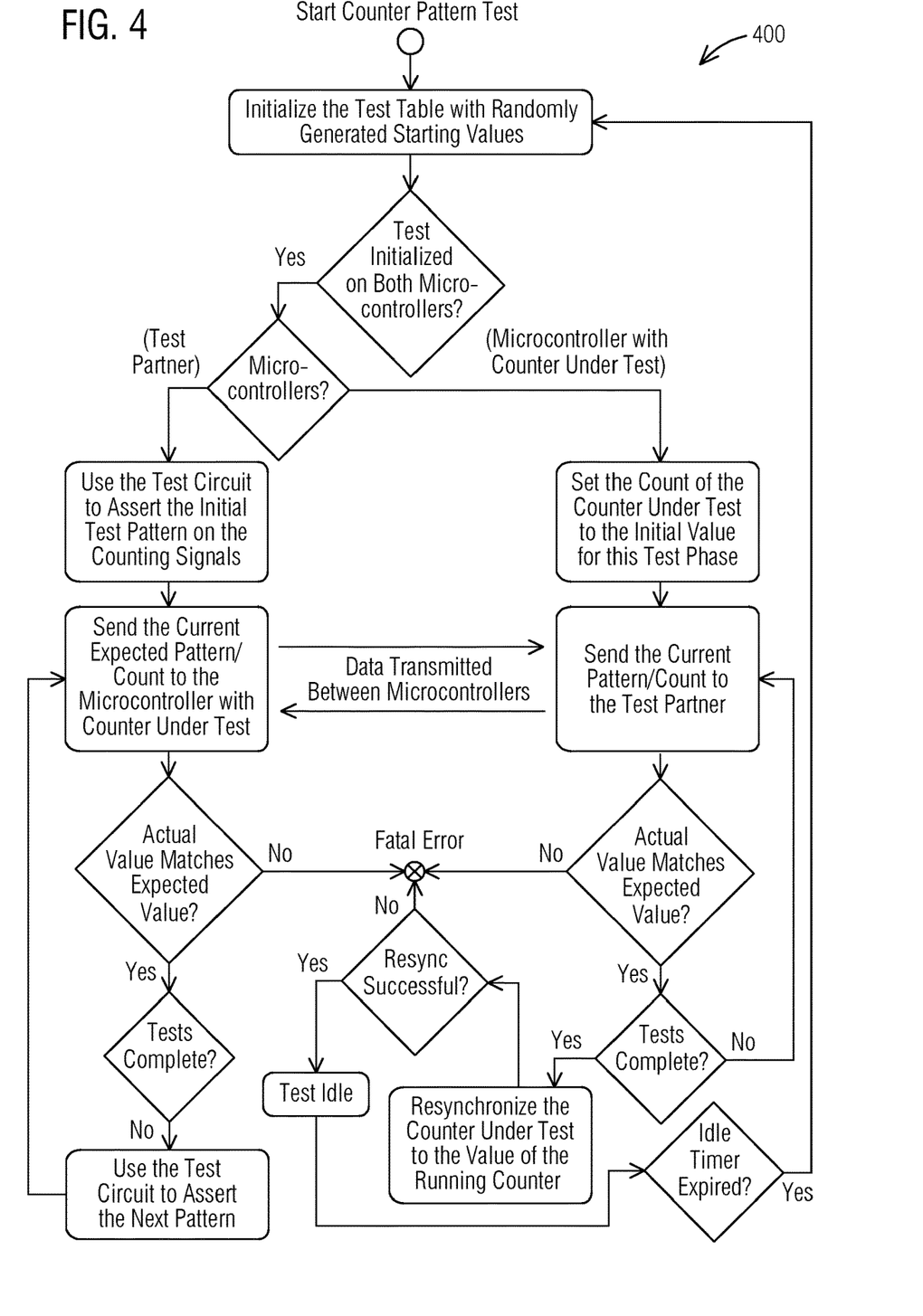
FIG. 4 illustrates a flow chart of a Counter Pattern Test in accordance with an exemplary embodiment of the present invention.

FIG. 4 illustrates a flow chart 400 of a Counter Pattern Test in accordance with an exemplary embodiment of the present invention. The overall flow of the counter pattern test is represented in this flowchart 400. When a test is started, a test table is generated in the module firmware 207(1-2) on both microcontrollers 215(1-2) which contains the test steps which will be performed with randomized starting values for the relevant test sections. Each of the four hardware counters 220(1-4) is tested in succession starting with a first counter. As an example, when testing hardware counter 1 on microcontroller 1 (uC1), uC1 is the microcontroller with a counter under test since it contains this counter and microcontroller 2 (uC2) is the test partner since it has the test signals 222(1-2) to drive the relevant test circuits 210(1-2) to influence the counter signals applied to the counter under test. The test partner asserts the initial test pattern on the counting signals 212(1-4) while the microcontroller with counter under test sets the count to the initial value. Test steps are performed such that the two microcontrollers 215(1-2) exchange the current actual counter value and the expected value so that they can compare and look for discrepancies and update the counter signals for the next step. If either microcontroller detects a mismatch between the expected and actual value for a test step, a fatal error is generated. At the completion of the test, the microcontroller with counter under test performs a resynchronization operation to resynchronize the counter under test with the running counters. If successful, the test is now complete. If the resynchronization is unsuccessful, a fatal error is generated. On successful completion of a test, a timer is referenced to determine when to run the entire test again.

Figure 5:
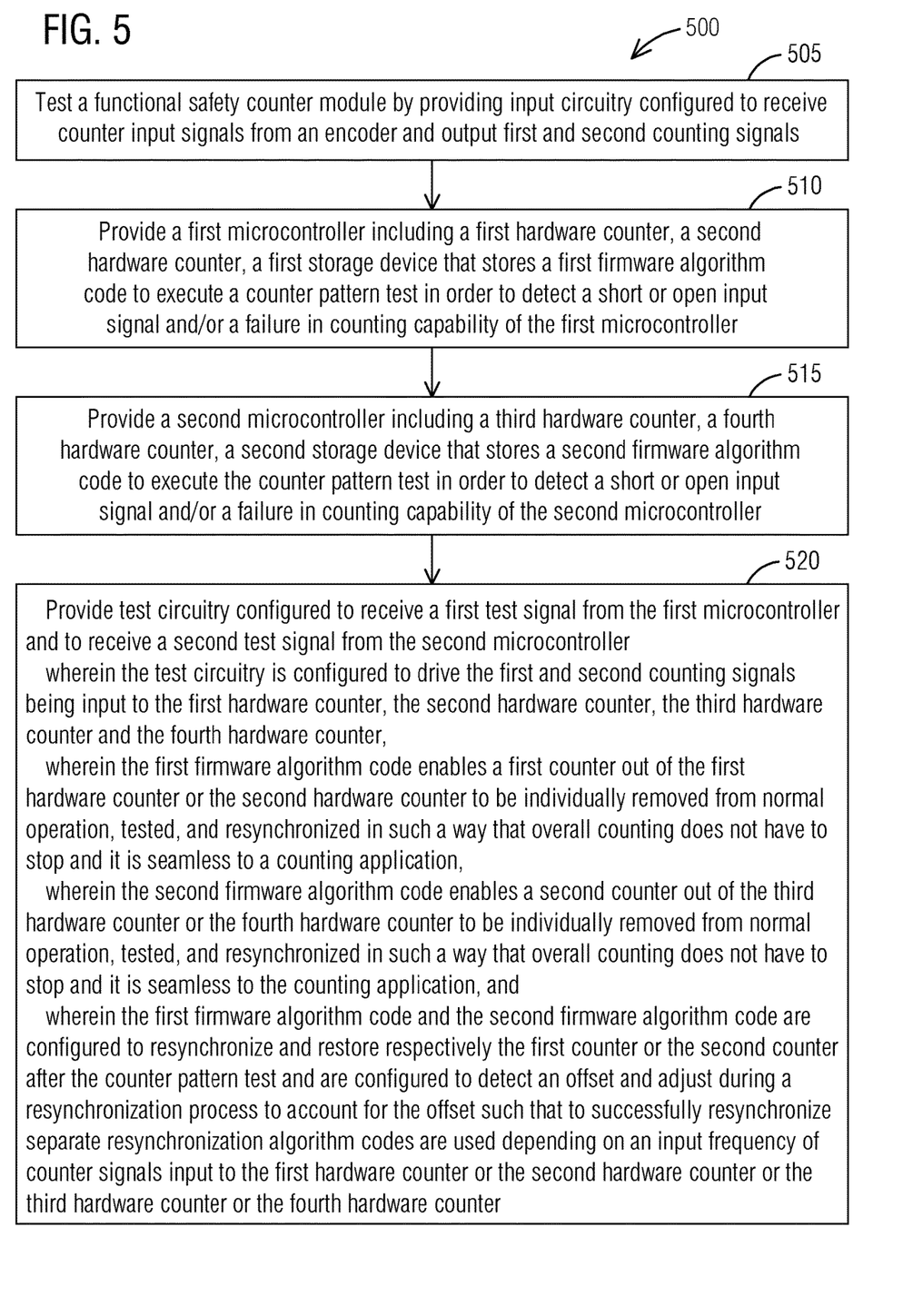
FIG. 5 illustrates a schematic view of a flow chart of a method of testing a Functional Safety Counter Module in accordance with an exemplary embodiment of the present invention.

FIG. 5 illustrates a schematic view of a flow chart of a method 500 of testing a Functional Safety Counter Module in accordance with an exemplary embodiment of the present invention. Reference is made to the elements and features described in FIGS. 1-4. It should be appreciated that some steps are not required to be performed in any particular order, and that some steps are optional.

The method 500 comprises a step 505 of providing input circuitry configured to receive counter input signals from an encoder and output first and second counting signals. The method 500 further comprises a step 510 of providing a first microcontroller including a first hardware counter, a second hardware counter, a first storage device that stores a first firmware algorithm code to execute a counter pattern test in order to detect a short or open input signal and/or a failure in counting capability of the first microcontroller. The method 500 further comprises a step 515 of providing a second microcontroller including a third hardware counter, a fourth hardware counter, a second storage device that stores a second firmware algorithm code to execute the counter pattern test in order to detect a short or open input signal and/or a failure in counting capability of the second microcontroller. The method 500 further comprises a step 520 of providing test circuitry configured to receive a first test signal from the first microcontroller and to receive a second test signal from the second microcontroller.

The test circuitry is configured to drive the first and second counting signals being input to the first hardware counter, the second hardware counter, the third hardware counter and the fourth hardware counter. The first firmware algorithm code enables a first counter out of the first hardware counter or the second hardware counter to be individually removed from normal operation, tested, and resynchronized in such a way that overall counting does not have to stop and it is seamless to a counting application. The second firmware algorithm code enables a second counter out of the third hardware counter or the fourth hardware counter to be individually removed from normal operation, tested, and resynchronized in such a way that overall counting does not have to stop and it is seamless to the counting application. The first firmware algorithm code and the second firmware algorithm code are configured to resynchronize and restore respectively the first counter or the second counter after the counter pattern test and are configured to detect an offset and adjust during a resynchronization process to account for the offset such that to successfully resynchronize two separate resynchronization algorithm codes are used depending on an input frequency of counter signals input to the first hardware counter or the second hardware counter or the third hardware counter or the fourth hardware counter.

In operation, the "first firmware algorithm" (firmware running on uC1) tests counters 1 and 2 while the "second firmware algorithm" (firmware running on uC2) tests counters 3 and 4. Also, since both microcontrollers (i.e. both firmware algorithms) test their respective counters, they both resynchronize those counters after their tests. As a point of clarification, the same software is loaded on both microcontrollers but during execution each microcontroller's role changes depending on which counter is being tested. For example, if counter 1 is being tested, the "first firmware algorithm" removes counter 1 from operation, the "second firmware algorithm" applies test signals to it, and the "first firmware algorithm" checks the result and sends the result to the "second firmware algorithm" so it can evaluate it as well. Under normal operation, the "counter signals" are output from the "SIL Rated Encoder" which is external to the F Counter Module, are conditioned by the "Termination, Clamping, Filtering" and "Conversion" blocks and then are input to the H/W Counters 1-4. While a counter pattern test is occurring, the "counter signals" are being forced into the desired test state by the "Test Circuit" with control signals coming from uC1/uC2 microcontrollers depending on which counter is currently under test.

Applying an offset during resynchronization at low speeds is described next. If the input signals for the primary and alternate counters are not currently in the same state, an offset must be applied when resynchronizing using the low-speed algorithm. For example, if an encoder is stopped at a signal edge the running counter may see the edge but due to differences in the input circuits the counter under test may not. If resynchronization was performed without an offset, the counter under test would be set to the value of the running counter. When motion resumed, the counter under test would see the edge and increment its count. The two counters would now be at the same physical position but with different count values.

There are 3 possible offsets that may be applied (0, 1, and −1). An offset of "0" is applied if the counter under test and running counter have the same input signal state (A running=A under test and B running=B under test). An offset of "1" is applied if the counters are one state apart and the counter under test is currently at the greater position value. An offset of "−1" is applied if the counters are one state apart and the running counter is currently at the greater position value. The counters should never become more than one edge apart from each other. If this occurs, a hard error is generated in the resynchronization routine. The offset is applied such that: Count of Counter under test=Count of Running counter+offset.

While a 2 microcontroller and 4 counters configuration is described here a range of one or more other types of setups or other forms of mix and match configurations are also contemplated by the present invention. For example, other types of microcontroller-counter combinations may be implemented based on one or more features presented above without deviating from the spirit of the present invention.

The techniques described herein can be particularly useful for Fail-Safe/Functional Safety High-Speed Counter Module. While particular embodiments are described in terms of specific configuration of a Counter Module, the techniques described herein are not limited to such a limited configuration but can also be used with other configurations and types of Counter Modules.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A Functional Safety Counter Module, comprising:
input circuitry configured to receive counter input signals from an encoder and output first and second counting signals;
a first microcontroller including a first hardware counter, a second hardware counter, a first storage device that stores a first firmware algorithm code to execute a counter pattern test in order to detect a short or open input signal and/or a failure in counting capability of the first microcontroller;

a second microcontroller including a third hardware counter, a fourth hardware counter, a second storage device that stores a second firmware algorithm code to execute the counter pattern test in order to detect a short or open input signal and/or a failure in counting capability of the second microcontroller; and test circuitry configured to receive a first test signal from the first microcontroller and to receive a second test signal from the second microcontroller, wherein the test circuitry is configured to drive the first and second counting signals being input to the first hardware counter, the second hardware counter, the third hardware counter and the fourth hardware counter, wherein the first firmware algorithm code enables a first counter out of the first hardware counter or the second hardware counter to be individually removed from normal operation, tested, and resynchronized without stopping counting applications, wherein the second firmware algorithm code enables a second counter out of the third hardware counter or the fourth hardware counter to be individually removed from normal operation, tested, and resynchronized without stopping counting applications, and wherein the first firmware algorithm code and the second firmware algorithm code are configured to resynchronize and restore respectively the first counter or the second counter after the counter pattern test and are configured to detect an offset and adjust during a resynchronization process to account for the offset, wherein separate resynchronization algorithm codes are used depending on an input frequency of counter signals input to the first hardware counter or the second hardware counter or the third hardware counter or the fourth hardware counter, wherein after completion of the counter pattern test a counter under test is resynchronized to an active counter by assigning a count of the counter under test to a count of the active counter that is running and being a counter that has not been tested, and wherein the separate resynchronization algorithm codes include a low-speed algorithm code being used for sinusoidal input frequencies below 125 kHz which calculates and applies the offset to the count of the counter under test to compensate for a scenario where a current position is at an edge in between encoder states.

2. The Functional Safety Counter Module of claim 1, wherein testing is performed without disrupting counting and/or missing incoming counts.

3. The Functional Safety Counter Module of claim 1, wherein the test circuitry allows the first firmware algorithm code and the second firmware algorithm code to individually force the counter input signals as Sin/Cos and N counter input signals of one of four available counters being the first hardware counter, the second hardware counter, the third hardware counter, the fourth hardware counter high or low without affecting the input signals to the other three counters.

4. The Functional Safety Counter Module of claim 3, wherein the first firmware algorithm code and the second firmware algorithm code periodically take one of the four available counters offline, perform a test to validate the counter input signals and counting capability, and then restore and resynchronize a counter under test to three other counters of the four available counters.

5. The Functional Safety Counter Module of claim 1, wherein the counter pattern test provides a way to diagnose failures in the input circuitry and/or the first hardware counter, the second hardware counter, the third hardware counter and the fourth hardware counter without limiting availability.

6. The Functional Safety Counter Module of claim 1, wherein the test circuitry includes first and second test circuits that are implemented to allow respective individual control of the counter input signals to each hardware counter of the first hardware counter, the second hardware counter, the third hardware counter and the fourth hardware counter.

7. The Functional Safety Counter Module of claim 1, wherein the counter pattern test initializes a start value and then initiates counting operations (pulses) in both directions such that in one set of cases start values are initialized to force rollovers from both positive and negative directions and in other cases start values are randomly generated numbers.

8. A Functional Safety Counter Module, comprising:

input circuitry configured to receive counter input signals from an encoder and output first and second counting signals;

a first microcontroller including a first hardware counter, a second hardware counter, a first storage device that stores a first firmware algorithm code to execute a counter pattern test in order to detect a short or open input signal and/or a failure in counting capability of the first microcontroller;

a second microcontroller including a third hardware counter, a fourth hardware counter, a second storage device that stores a second firmware algorithm code to execute the counter pattern test in order to detect a short or open input signal and/or a failure in counting capability of the second microcontroller; and test circuitry configured to receive a first test signal from the first microcontroller and to receive a second test signal from the second microcontroller, wherein the test circuitry is configured to drive the first and second counting signals being input to the first hardware counter, the second hardware counter, the third hardware counter and the fourth hardware counter, wherein the first firmware algorithm code enables a first counter out of the first hardware counter or the second hardware counter to be individually removed from normal operation, tested, and resynchronized without stopping counting applications, wherein the second firmware algorithm code enables a second counter out of the third hardware counter or the fourth hardware counter to be individually removed from normal operation, tested, and resynchronized without stopping counting applications, and wherein the first firmware algorithm code and the second firmware algorithm code are configured to resynchronize and restore respectively the first counter or the second counter after the counter pattern test and are configured to detect an offset and adjust during a resynchronization process to account for the offset, wherein separate resynchronization algorithm codes are used depending on an input frequency of counter signals input to the first hardware counter or the second hardware counter or the third hardware counter or the fourth hardware counter, wherein after completion of the counter pattern test a counter under test is resynchronized to an active counter by assigning a count of the counter under test to a count of the active counter that is running and being a counter that has not been tested, and wherein the separate resynchronization algorithm codes include a high-speed algorithm code being used for sinusoidal input frequencies at or above 125 kHz which sets the count of the counter under test to the count of the active counter and verifies the counter under test and the active counter match.

9. A method of testing a Functional Safety Counter Module, the method comprising:
   providing input circuitry configured to receive counter input signals from an encoder and output first and second counting signals;
   providing a first microcontroller including a first hardware counter, a second hardware counter, a first storage device that stores a first firmware algorithm code to execute a counter pattern test in order to detect a short or open input signal and/or a failure in counting capability of the first microcontroller;
   providing a second microcontroller including a third hardware counter, a fourth hardware counter, a second storage device that stores a second firmware algorithm code to execute the counter pattern test in order to detect a short or open input signal and/or a failure in counting capability of the second microcontroller; and
   providing test circuitry configured to receive a first test signal from the first microcontroller and to receive a second test signal from the second microcontroller,
   wherein the test circuitry is configured to drive the first and second counting signals being input to the first hardware counter, the second hardware counter, the third hardware counter and the fourth hardware counter,
   wherein the first firmware algorithm code enables a first counter out of the first hardware counter or the second hardware counter to be individually removed from normal operation, tested, and resynchronized without stopping counting applications,
   wherein the second firmware algorithm code enables a second counter out of the third hardware counter or the fourth hardware counter to be individually removed from normal operation, tested, and resynchronized without stopping counting applications, and
   wherein the first firmware algorithm code and the second firmware algorithm code
   are configured to resynchronize and restore respectively the first counter or the second counter after the counter pattern test and
   are configured to detect an offset and adjust during a resynchronization process to account for the offset,
   wherein separate resynchronization algorithm codes are used depending on an input frequency of counter signals input to the first hardware counter or the second hardware counter or the third hardware counter or the fourth hardware counter,
   wherein after completion of the counter pattern test a counter under test is resynchronized to an active counter by assigning a count of the counter under test to a count of the active counter that is running and being a counter that has not been tested, and
   wherein the separate resynchronization algorithm codes include a low-speed algorithm code being used for sinusoidal input frequencies below 125 kHz which calculates and applies the offset to the count of the counter under test to compensate for a scenario where a current position is at an edge in between encoder states.

10. The method of claim 9, wherein testing is performed without disrupting counting and/or missing incoming counts.

11. The method of claim 9, wherein the test circuitry allows the first firmware algorithm code and the second firmware algorithm code to individually force the counter input signals as Sin/Cos and N counter input signals of one of four available counters being the first hardware counter, the second hardware counter, the third hardware counter, the fourth hardware counter high or low without affecting the input signals to the other three counters.

12. The method of claim 11, wherein the first firmware algorithm code and the second firmware algorithm code periodically take one of the four available counters offline, perform a test to validate the counter input signals and counting capability, and then restore and resynchronize a counter under test to three other counters of the four available counters.

13. The method of claim 9, wherein the counter pattern test provides a way to diagnose failures in the input circuitry and/or the first hardware counter, the second hardware counter, the third hardware counter and the fourth hardware counter without limiting availability.

14. The method of claim 9, wherein the test circuitry includes first and second test circuits that are implemented to allow respective individual control of the counter input signals to each hardware counter of the first hardware counter, the second hardware counter, the third hardware counter and the fourth hardware counter.

15. The method of claim 9, wherein the counter pattern test initializes a start value and then initiates counting operations (pulses) in both directions such that in one set of cases start values are initialized to force rollovers from both positive and negative directions and in other cases start values are randomly generated numbers.

* * * * *